United States Patent [19]

Goble

[11] Patent Number: 5,151,207
[45] Date of Patent: Sep. 29, 1992

[54] DROP-IN SUBSTITUTE FOR DICHLORODIFLUOROMETHANE REFRIGERANT

[76] Inventor: George H. Goble, 286 W. Navajo, West Lafayette, Ind. 47906

[21] Appl. No.: 638,350

[22] Filed: Jan. 7, 1991

[51] Int. Cl.⁵ .............................................. C09K 5/04
[52] U.S. Cl. ......................................... 252/67; 62/114
[58] Field of Search ............................. 252/67; 62/114

[56] References Cited

U.S. PATENT DOCUMENTS

| | | | |
|---|---|---|---|
| 4,303,536 | 12/1981 | Orfeo et al. | 252/67 |
| 4,482,465 | 11/1984 | Gray | 252/67 |
| 4,510,064 | 4/1985 | Ermak | 252/67 |
| 4,810,403 | 3/1989 | Bivens et al. | 252/67 |

FOREIGN PATENT DOCUMENTS

| | | |
|---|---|---|
| 2716834 | 10/1977 | Fed. Rep. of Germany . |
| 61-287979 | 12/1986 | Japan . |
| 2228739 | 9/1990 | United Kingdom . |

*Primary Examiner*—Christine Skane
*Attorney, Agent, or Firm*—Woodard, Emhardt, Naughton, Moriarty & McNett

[57] ABSTRACT

A novel ternary mixture of refrigerants that can be drop-in substituted for dichlorodifluoromethane (R-12), but that, unlike dichlorodifluoromethane, causes very little ozone damage, comprising aproximately 2 to 20% by weight isobutane (R-600a), approximately 41 to 71% by weight chlorodifluoromethane (R-22), and aproximately 21 to 51% by weight chlorodifluoroethane (R-142b), with the weight percentages being of the overall mixture.

6 Claims, No Drawings

DROP-IN SUBSTITUTE FOR DICHLORODIFLUOROMETHANE REFRIGERANT

The present invention relates to refrigerants generally, and more specifically to a mixture of refrigerants that may be substituted for the environmentally damaging refrigerant dichlorodifluoromethane (R-12).

BACKGROUND OF THE INVENTION

Butane, isobutane, propane, and other hydrocarbons were commonly used as refrigerants prior to World War II. The introduction of the family of FREON® fluorocarbon products in the early 1930s provided nonflammable, nontoxic, and what were believed to be environmentally safe substitute refrigerants for hydrocarbons. Fluorocarbons largely supplanted hydrocarbons as refrigerants of choice in most applications following World War II. Hydrocarbons are still in use today in special low temperature refrigeration systems (−100 degree Fahrenheit) due to the relatively high boiling points of fluorocarbons.

Certain chlorine containing fluorocarbon refrigerants, known as chlorofluorocarbons (CFC's), have been causally linked to the well-documented depletion of the earth's ozone layer. The Montreal Protocol and the United States Environmental Protection Agency EPA) have thus called for a phase out of the use of the CFCs that are known to be contributing to the degradation of the environment, and specifically to ozone layer depletion. Dichlorodifluoromethane ($CCl_2F_2$), also known as CFC-12, Refrigerant-12, or simply R-12, is one of the most commonly used CFC refrigerants in automobile air conditioners and elsewhere. It is also the CFC refrigerant with the highest ozone depletion potential of any known refrigerant. R-12 has an "ozone depletion units" (ODU) measure of 1.0, and serves as the yardstick of ozone depletion potential against which all other refrigerants are measured.

New automobile air conditioners built in 1989 consumed 20 million pounds of R-12. An additional 80 million pounds of R-12 were consumed that year in replenishing the R-12 refrigerant that leaked from existing automobile air conditioners. Leaking of R-12 from automobile air conditioning systems is in fact a major source of the R-12 that escapes into the atmosphere each year.

Since the discovery in the 1970's that CFC refrigerants escaping into the atmosphere were depleting the earth's ozone layer, many companies have spent large sums of money trying to develop a non-toxic, nonflammable replacement for R-12 that could be "dropped into" existing automobile air conditioning systems as a substitute for R-12 without requiring any equipment changes. To date, no such "drop in" substitutes for R-12 have been announced. Consequently, the automobile industry plans to develop and market new automobile air conditioning systems by the 1995 model Year that use an ozone safe refrigerant, tetrafluoroethane ($CH_2FCF_3$), also known as, FC-134a, Refrigerant-134a, or simply R-134a. Fortunately, R-134a has an ozone depletion factor (ODF) of zero. Unfortunately, R-134a cannot be drop-in substituted for R-12 in existing air conditioning systems due to compressor lubrication problems inherent in the use of R-134a in present systems, the inadequacy of the hoses used in present systems to handle R-134a, and the necessity of using a larger compressor than is now in use with R-12 refrigerant to Properly utilize R-134a.

Most automobiles that will be built through the 1994 model Year will still require the use of an R-12 refrigerant, or an acceptable drop-in substitute. With the environmental efforts to phase out, or ban, the use of ozone-depleting CFC's gaining momentum, it appears that an R-12 drop-in substitute for use in existing air conditioning systems must be found.

SUMMARY OF THE INVENTION

The present invention provides a novel ternary mixture of refrigerants that can be substituted for R-12, but that, unlike R-12, causes very little ozone damage. It is free of R-12. The novel mixture of refrigerants of the present invention provides an acceptable level of cooling in medium and high temperature applications where R-12 is now in use, such as in coolers and air conditioners operating at evaporating temperatures of 25 degrees Fahrenheit and higher, i.e., automobile air conditioners. It also mixes well with compressor oils, thereby providing for adequate lubrication of existing compressors that utilize R-12. The novel ternary mixture of refrigerants of the present invention is therefore a "drop-in" substitute for R-12.

One embodiment of the present invention comprises a ternary mixture of refrigerants that is a drop-in substitute for dichlorodifluoromethane (R-12), comprising about 2 to 20 weight percent isobutane (R-600a), about 21 to 51 weight percent chlorodifluoroethane (R-142b), and about 41 to 71 weight percent chlorodifluoromethane (R-22), with the weight percentages of the components being weight percentages of the overall mixture.

Another embodiment of the present invention comprises a method for producing refrigeration in a refrigeration system designed for a dichlorofluoromethane (R-12) refrigerant, comprising drop-in substituting for the dichlorofluoromethane (R-12) a ternary mixture of about 2 to 20 weight percent isobutane (R-600a), about 21 to 51 weight percent chlorodifluoroethane (R-142b), and about 41 to 71 weight percent chlorodifluoromethane (R-22), with the weight percentages of the components being weight percentages of the overall mixture; condensing the ternary mixture; and thereafter evaporating the ternary mixture in the vicinity of a body to be cooled.

It is an object of the present invention to provide a "drop in" substitute for R-12 that causes very little ozone damage.

It is also an object of the present invention to provide a substitute refrigerant for R-12 that has an ozone depletion factor (ODF) of approximately 0.05.

It is also an object of the present invention to provide a drop-in substitute refrigerant for R-12 that provides an acceptable level of cooling in medium and high temperature applications where R-12 is now in use, and that mixes well with compressor oils that are miscible with R-12 to provide for adequate lubrication of existing compressors that utilize R-12.

Related objects and advantages of the present invention will be apparent from the following description.

DESCRIPTION OF THE PREFERRED EMBODIMENT

For the purposes of promoting an understanding of the principles of the invention, reference will now be made to the embodiments described below, and specific language will be used to describe the same. It will nevertheless be understood that no limitation of the scope of the invention is thereby intended, such alterations and further modifications in the described embodiments, and such further applications of the principles of the invention as described therein being contemplated as would normally occur to one skilled in the art to which the invention relates.

The novel ternary mixture of refrigerants of the present invention includes a mixture of approximately 2 to 20% by weight isobutane (R-600a), approximately 21 to 51% by weight chlorodifluoroethane (R-142b), and approximately 41 to 71% by weight chlorodifluoromethane (R-22), with the weight percentages totalling 100%. This novel mixture of refrigerants is a drop-in substitute for R-12 in medium or high temperature applications, such as coolers and air conditioners operating at evaporating temperatures of 25 degrees Fahrenheit and higher.

Compared with R-12's ozone depletion factor (ODF) of 1.0, however, this novel mixture has an ozone depletion factor of about 0.05, and will be classified as an EPA CLASS-II substance under the Federal Clean Air Act, as amended. R-12 is a CLASS-I substance. R-22 and R-142b are not production controlled or taxed by the EPA or under the Montreal Protocol at this time.

Typical air conditioning compressor operation produces a "fog" consisting of about 10% compressor lubrication (mineral) oil mixed in the refrigerant discharge hot gas stream leaving the compressor. The refrigerant typically condenses to liquid at temperatures of about 100 to 180 degrees Fahrenheit. The warm refrigerant liquid lowers the viscosity of the oil it is carrying, so oil build up in the high pressure (liquid) side of the refrigeration circuit is not a problem. However, after passing through the expansion device, the refrigerant temperature drops to the 32 to 35 degree Fahrenheit range and boils back to the gas phase in the evaporator. The oil will thicken and tend to become trapped in the evaporator if it is not readily miscible in the refrigerant. The refrigerant leaves the evaporator as a gas, leaving much of the oil behind, which then starves the compressor of oil and leads ultimately to compressor failure.

On the the other hand, an oil miscible refrigerant, such as R-12, causes the oil and refrigerant to mix during the condensation phase. This greatly lowers the viscosity of the oil during the evaporation phase. Since the oil contains large amounts of dissolved refrigerant, which is now boiling and foaming, and is still low in viscosity, the oil gets carried out of the evaporator by the gas stream. Now in the warm suction line, most of the remaining refrigerant leaves the oil. Since the gas velocity is higher and the suction line is much warmer than the evaporator, the oil can find its way back to the compressor by creeping along the walls of the warm suction line.

R-22 and R-142b are polar substances that have limited miscibility with the compressor lubrication oils typically used in air conditioning systems charged with R-12 refrigerant. In testing done to date with samples of R-142b and R-22 mixed with approximately 10% by volume of a 525 viscosity automotive refrigeration oil typically used in R-12 systems, both R-142b and R-22 did not stay mixed with the 525 viscosity oil at evaporation temperatures (35 degrees Fahrenheit). Testing has also shown that R-12 refrigerant and the novel ternary mixture of the present invention stayed mixed with the 525 viscosity oil, even at 0 degrees Fahrenheit.

It would be possible to use a binary mix of R-22 and R-142b in existing R-12 automobile systems, but the 525 viscosity oil used in R-12 systems would have to be changed and replaced with an oil designed for use with an R-22 refrigerant. Oils designed for R-22 systems are usually of a viscosity of 150 to 300. To date, no commercially marketed 525 viscosity oil is known to be miscible with R-22 refrigerants. Due to the extreme conditions automotive air conditioners sometimes encounter, the use of 150 to 300 viscosity oils may cause lubrication problems if the oil becomes too thin.

Changing the oil in an existing R-12 system is also time consuming and costly. Oil is spread out over the entire refrigeration circuit, so draining the compressor will only get part (usually just ½) of the oil in the entire system. A common method of cleaning the oil from an R-12 system is flushing the system with trichlorofluoromethane ($CCl_3F$), also known as R-11. This requires the inconvenience of disconnecting the system piping. Also, R-11 has the same ozone depletion factor as R-12, and it is becoming expensive and hard to find. Using several pounds of R-11 to flush an existing R-12 system is therefore environmentally unsound.

The isobutane component of the ternary mixture of the present invention keeps 525 viscosity oil miscible with the novel mixture of the present invention at evaporator temperatures, and also provides refrigeration effect near the output side of the evaporator. Thus, the isobutane component aids in the oil return from the evaporator back to the compressor, and, in fact, is a necessary component to prevent lubrication-related compressor failures in R-12 designed systems.

The small amount by weight of isobutane utilized in the mixture of the present invention does not appear to cause flammability problems. In comparison testing with a binary mixture of isobutane and R-22, the R-22 component of the ternary mixture of the invention appeared to leave the ternary mixture more slowly when a system leak occurred, and did not concentrate the isobutane to flammable limits. In the binary isobutane/R-22 mixture, by contrast, the R-22 left the binary mixture quickly, concentrating the isobutane to flammable limits at the leak location.

Table I sets forth examples of ternary mixtures of the invention with known tolerances to date. Percentages are weight percentages, and components total about 100%.

TABLE I

| Mixture | Isobutane | R-142b | R-22 |
|---|---|---|---|
| A | 8% +/− 2% | 36% +/− 2% | 56% +/− 2% |
| B | 8% + 10% − 5% | 36% +/− 10% | 56% +/− 2% |
| C | 8% + 12% − 6% | 36% +/− 15% | 56% +/− 15% |
| D | 8% +/− 2% | 28% +/− 7% | 64% +/− 7% |

Mixture A has been the most preferred mixture to date. Mixture B would work in most instances. However, mixtures at the high end of the isobutane range, and/or the high end of the R-142b range may lead to flammability problems in standard automobile air conditioning systems designed for R-12. Also, mixtures at the low end of the isobutane range, and/or the low end of the R-142b range, may lead to compressor oil starvation (poor oil return) and excessive system pressures when used in an automobile air conditioning system powered by an engine that is being revved while the automobile is not in motion on very hot days (90 degrees Fahrenheit or hotter).

Mixture C will cause flammability problems in standard automobile air conditioning systems designed for R-12 when the R-142b and/or isobutane components are at the maximum weight percentages. Low performance or liquid slugging may also occur. If the weight percentage for R-22 is at the maximum, high system pressures will occur and lead to hoses bursting or other standard automobile air conditioning system failures. However, Mixture C may work well at the high and low ends of the component limits in non automotive systems, such as household air conditioning systems or heatpumps, in R-22 systems, or in modified automobile air conditioning systems designed for R-12. Mixture C may also work well at the high and low ends of the component limits in standard automobile air conditioning systems designed for R-12 that are operated only under special conditions, such as at 60 degree Fahrenheit ambient temperature or lower.

Mixture D represents a high performance mixture that would deliver 50 to 100% more cooling at higher temperatures. Mixture D would require minor equipment changes to the standard automobile air conditioning system to add a high pressure cutoff switch to the high side (liquid) line gauge service port. The recommended cutoff pressure would be 375 to 400 PSIG, with a cut in pressure of 250 PSIG. Such a switch needs to be installed in series with the compressor clutch circuit to disable the compressor when the cut out pressure is reached. Revving an automobile engine while not in motion at an ambient temperature of over approximately 90 degrees Fahrenheit would cause the cut out to operate. Engine idle speeds probably will not cause a high pressure cut out if the condenser is clean. When the vehicle is in motion, ram air should provide adequate condenser heat dissipation to prevent over pressure cut outs.

In testing completed to date, the ternary mixture of the invention has exhibited much better cooling than R-12 at temperatures above ambient temperatures (70–75 degrees Fahrenheit). On nonexpansion valve air conditioning systems found in most U.S. made vehicles (orifice only), head pressure of the ternary mixture of the present invention falls off below 70–75 degrees Fahrenheit, reducing the system capacity to what would be provided by R-12.

For the purpose of promoting a better understanding of and to further illustrate the invention, reference will now be made in the Examples below to preferred ternary mixtures of refrigerants of the invention.

EXAMPLE 1

A mixture of 8.4% by weight isobutane, 35.7% by weight R-142b, and 55% by weight R-22 was provided in the following manner (the weight percentages add up to 99.1% due to a measurement error). TIF electronic refrigerant "charging" scales were used to weigh in the charge. A vacuum was pulled on a Roninair 4 lb. capacity "dial-a-charge" refrigerant measuring cylinder. The isobutane (liquid) was weighed into the vacuum in the dial-a-charge. The pressure was about 26 PSIG at 73 degrees Fahrenheit. The R-142b was then weighed into the dial-a-charge. R-22 was then weighed in slowly with intermittent shaking of the dial-a-charge to mix the isobutane and R-22 and noting of the pressure. R-22 was added in this fashion until the pressure reading on the dial-a-charge was approximately 7 to 8 PSIG higher than what R-12 would have been at the temperature of mixing. For this example, at 73 degrees Fahrenheit the pressure of 80 PSIG was used as the stopping point for adding R-22. R-22 was added over a period of about 20 minutes to allow temperatures to stabilize within the dial-a-charge.

The dial-a-charge was then removed from the charging manifold/gauges and was connected to the air conditioning system of a 1978 Datsun 810 and the system was charged in the conventional manner. The oil in this system already contained a red dye for leak detection. Samples, under pressure, were taken with a vizi-charge from the liquid line during operation. The vizi-charge was then switched to the low (suction line), and the valve slowly opened to boil off the working fluid in order to observe the amount of oil carried in the sample. About 10 to 12% by volume of oil was observed after the refrigerant boiled off. Oil was observed to be still mixed evenly in the vizi-charge after setting for 3 days.

The mixture within the dial-a-charge was tested for flammability, but could not be ignited.

Cooling in the 1978 Datsun 810 seemed slightly better than that obtained previously with R-12, although no detailed BTU measurements were taken. Suction (low side) and discharge (high side) pressures were close to those obtained with R-12. At ambient temperatures in the low 70's, low side pressure was about 11 to 13 PSIG (at 2000 rpm; R-12 would be about 18 PSIG), and high side pressure was about 150 PSIG. Momentary high side pressures were obtained around 200 PSIG with a hot engine, stopped at traffic lights, with the ambient temperature in the high 70's. This is close to the high side pressures of R-12.

The air outlets within the automobile were emitting chilled air in the 38 to 40 degrees Fahrenheit range, and the compressor was cycling on and off due to the low temperature cut out being reached. The 1978 Datsun 810 has the receiver (storage tank) in the high pressure side rather than in the low side as found in typical General Motors systems. The lower suction pressures seemed to be due to the evaporator being colder by 5 to 7 degrees Fahrenheit than was the case with R-12.

EXAMPLE 2

Additional testing of the mixture of Example 1 was done in a 1990 Pontiac Transsport equipped with a Harrison (GM) "V-5" variable displacement compressor. This compressor reduces its displacement (capacity) when the suction pressure drops below 28 PSIG. Compressor gas discharge temperatures appeared to be close at idle with an ambient temperature of 87 degrees Fahrenheit to those of an identical model 1990 Pontiac Transsport at a new car dealer that utilized standard R-12 refrigerant. The R-12 system idled at 150 degrees Fahrenheit and the mixture of Example 1 idled at 154 degrees Fahrenheit.

Head (high side) pressures for the mixture of Example 1 were lower than in the R-12 system when the vehicles were in motion (30 to 65 MPH), ranging from 220 to 150 PSIG at an ambient temperature in the low 90's. Racing the engine (2000 to 3000 RPM) while parked caused slightly higher head pressures than the R-12 system. The R-12 system with MAX-AIR engaged was able to reach 400 PSIG at an ambient temperature of 100 degrees Fahrenheit, but the mixture of Example 1 reached 400 PSIG at an ambient temperature in the low 90's. This appears to be due to the fact that more heat is transferred and the condenser is less able to get rid of the heat with no ram air. At normal idle speeds and an ambient temperature of 95 degrees Fahrenheit, head pressures of around 250 to 260 PSIG were observed, well within system limits.

Increasing the weight percentage of R-22 in the mixture of Example 1 tends to drive up head pressures and also moves more heat, leading to cooler discharge air. Idle performance with a higher R-22 weight percentage produced pressures approaching design limits at ambient temperatures of 95 degrees Fahrenheit or above. A pressure limiting cut out switch that would be connected t the high side service valve and would be used to disengage the compressor if high idle or racing the engine while parked raised pressure too high (i.e., 375 PSIG) would provide much superior cooling performance during normal operation. Cooling would be between 50% to 100% more than a comparable R-12 system.

Lowering the weight percentages of R-22 in the mixture of Example 1 reduced the cooling capacity and lowered head pressure while raising suction pressure. On nonvariable displacement compressors, the suction pressure would be expected to decrease instead of increase in this case. This moved the mixture toward increased flammability as well. Head pressures dropped significantly with the vehicle in motion to the point of reducing refrigerant flow through the expansion device, which greatly reduced cooling.

While the invention has been described in the Examples and foregoing description, the same is to be considered as illustrative and not restrictive in character, it being understood that only preferred embodiments have been described and that all changes and modifications that come within the spirit of the invention are desired to be protected.

What is claimed is:

1. A ternary mixture of refrigerants that is a drop-in substitute for dichlorodifluoromethane refrigerant in dichlorodifluoromethane refrigeration systems, comprising about 2 to 20 weight percent isobutane, about 21 to 51 weight percent 1-chloro-1, 1-difluoroethane, and about 41 to 71 weight percent chlorofluoromethane, with the weight percentages of said components being weight percentages of the overall mixture.

2. The ternary mixture of refrigerants of claim 1 in which isobutane is present in about 6 to 10 weight percent, 1-chloro-1, 1-difluoroethane is present in about 21 to 35 weight percent, and chlorodifluoromethane is present in about 57 to 71 weight percent, the weight percentages of said components being weight percentages of the overall mixture.

3. The ternary mixture of refrigerants of claim 1 in which isobutane is present in about 3 to 18 weight percent, 1-chloro-1, 1-difluoroethane is present in about 26 to 46 weight percent, and chlorodifluoromethane is present in about 46 to 66 weight percent, the weight percentages of said components being weight percentages of the overall mixture.

4. The ternary mixture of refrigerants of claim 3 in which isobutane is present in about 6 to 10 weight percent, 1-chloro-1, 1-difluoroethane is present in about 34 to 38 weight percent, and chlorodifluoromethane is present in about 54 to 58 weight percent, the weight percentages of said components being weight percentages of the overall mixture.

5. The ternary mixture of refrigerants of claim 1 in which said mixture is miscible with refrigeration oils that are miscible with dichlorodifluoromethane.

6. The ternary mixture of refrigerants of claim 5 in which the weight percentage of isobutane renders the mixture miscible with refrigerants oils that are miscible with dichlorodifluoromethane.

* * * * *

UNITED STATES PATENT AND TRADEMARK OFFICE
CERTIFICATE OF CORRECTION

PATENT NO. : 5,151,207         Page 1 of 2
DATED      : September 29, 1992
INVENTOR(S): George H. Goble It is certified that error appears in the above-indentified patent and that said Letters Patent is hereby corrected as shown below:

In column 1, line 28, please change "EPA)" to -- (EPA) --.

In column 1, line 59, please change "Year" to -- year --.

In column 1, line 61, please change "FC-134a" to -- CFC-134a --.

In column 2, line 1, please change "Properly" to -- properly --.

In column 2, line 4, please change "Year" to -- year --.

In column 3, line 60, please change "refrigerant" to -- refrigerants --.

In column 5, line 62, please change "dial-a-charge" to -- vacuum --.

In column 7, line 10, please change "t" to -- to --.

In column 8, line 4, please change "chlorofluoromethane" to -- chlorodifluoromethane --.

UNITED STATES PATENT AND TRADEMARK OFFICE
CERTIFICATE OF CORRECTION

PATENT NO. : 5,151,207
DATED : September 29, 1992
INVENTOR(S) : George H. Goble

It is certified that error appears in the above-indentified patent and that said Letters Patent is hereby corrected as shown below:

In column 2, line 37, please change "dichlorofluoromethane" to -- dichlorodifluoromethane --.

In column 2, line 39, please change "dichlorofluoromethane" to -- dichlorodifluoromethane --.

Signed and Sealed this

Nineteenth Day of October, 1993

Attest:

BRUCE LEHMAN

*Attesting Officer*     *Commissioner of Patents and Trademarks*